US010085266B1

(12) United States Patent
Pawar et al.

(10) Patent No.: US 10,085,266 B1
(45) Date of Patent: Sep. 25, 2018

(54) MANAGEMENT OF TTI BUNDLING FOR CARRIER AGGREGATED COMMUNICATIONS (71) Applicant: Sprint Spectrum L.P., Overland Park, KS (US)

(72) Inventors: Hemanth B. Pawar, Brambleton, VA (US); Shilpa Kowdley Srinivas, Brambleton, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 329 days.

(21) Appl. No.: 14/632,334

(22) Filed: Feb. 26, 2015

(51) Int. Cl.
 *H04W 72/04* (2009.01)
 *H04L 5/14* (2006.01)
 *H04L 5/00* (2006.01)

(52) U.S. Cl.
 CPC ....... *H04W 72/0486* (2013.01); *H04L 5/0094* (2013.01); *H04L 5/14* (2013.01)

(58) Field of Classification Search
 None
 See application file for complete search history.

(56) References Cited

U.S. PATENT DOCUMENTS

2008/0253319 A1 10/2008 Ji et al.
2011/0243278 A1* 10/2011 Cheng ................. H03M 13/136
 375/340
2012/0282942 A1 11/2012 Uusitalo et al.
2013/0114517 A1 5/2013 Blankenship et al.
2013/0322357 A1* 12/2013 He .................... H04W 72/0406
 370/329

(Continued)

FOREIGN PATENT DOCUMENTS

EP       2 385 653 A2    11/2011
WO   WO 2013/138779 A1   9/2013

OTHER PUBLICATIONS

"Carrier Aggregation—Activation and Deactivation of Secondary Calls," How LTE Stuff Works?, printed from the World Wide Web, dated Oct. 17, 2014.

(Continued)

*Primary Examiner* — Jeffrey M Rutkowski
*Assistant Examiner* — Mehedi Aley (57) ABSTRACT

According to aspects of the present disclosure, a method and system are provided for wireless communication between a user equipment device (UE) and a base station using carrier aggregation and transmission time internal (TTI) bundling. The base station serves the UE with carrier aggregation on multiple carriers and determines, per carrier, a respective bundling size for transmitting a wireless communication between the UE and the base station with transmission TTI bundling on that component carrier. The determined bundling size for at least one of the plurality of component carriers is different than the determined bundling size for another one of the plurality of component carriers. While serving the UE with carrier aggregation on the multiple carriers, the base station invokes TTI bundling to transmit the wireless communication between the UE and the base station on each carrier with the respectively determined bundling size for that component carrier.

20 Claims, 4 Drawing Sheets

(56) References Cited

U.S. PATENT DOCUMENTS

| | | | |
|---|---|---|---|
| 2013/0343273 A1 | 12/2013 | Barbieri et al. | |
| 2014/0056237 A1 | 2/2014 | Eriksson et al. | |
| 2014/0092824 A1* | 4/2014 | He | H04W 52/0258 370/329 |
| 2014/0098761 A1* | 4/2014 | Lee | H04W 74/006 370/329 |
| 2015/0180619 A1* | 6/2015 | Majjigi | H04L 5/0005 370/330 |
| 2015/0237644 A1* | 8/2015 | Golitschek Edler von Elbwart | H04W 72/12 370/329 |
| 2015/0373721 A1* | 12/2015 | Zhang | H04L 5/0057 370/329 |

OTHER PUBLICATIONS

Co-Pending U.S. Appl. No. 14/447,604, filed Jul. 30, 2014.
Co-Pending U.S. Appl. No. 14/543,465, filed Nov. 17, 2014.
Co-Pending U.S. Appl. No. 14/575,428, filed Dec. 18, 2014.
Co-Pending U.S. Appl. No. 14/575,455, filed Dec. 18, 2014.

* cited by examiner

MANAGEMENT OF TTI BUNDLING FOR CARRIER AGGREGATED COMMUNICATIONS

BACKGROUND

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user). In general, each coverage area may operate on one or more carriers each defining one or more ranges of frequency spectrum and having a respective "downlink channel" for carrying communications from the base station to UEs and a respective "uplink channel" for carrying communications from the UEs to the base station. Such carriers may be frequency division duplex (FDD), in which the downlink and uplink channels are defined as separate respective ranges of frequency, or time division duplex (TDD), in which the downlink and uplink channels are defined on a common range of frequency but distinguished through time division multiplexing. Further, the downlink channel and uplink channel of each carrier may also be divided into respective sub-channels for carrying particular communications, such as one or more control channels for carrying control signaling and one or more traffic channels for carrying application-layer data and other traffic.

For instance, in a system operating according to an orthogonal frequency division multiple access (OFDMA) protocol, such as the Long Term Evolution (LTE) standard of the Universal Mobile Telecommunications System (UMTS) for example, the air interface is divided over time into frames and sub-frames each defining two slots, and the uplink and downlink channels are each divided over their frequency bandwidth into sub-carriers that are grouped within each slot into resource blocks. When a UE is positioned within coverage of a base station in such a system, the UE may register or "attach" with the base station on a particular carrier on which the base station is configured to provide, and the base station may then schedule particular downlink and uplink resource blocks on that carrier to carry data communications to and from the UE. Further, the base station and UE may modulate their air interface data communications at a coding rate selected based on quality of the UE's coverage, such as with higher rate coding rate when the UE is in better coverage of the base station and with a lower coding rate when the UE is in worse coverage of the base station.

In such LTE systems, a Hybrid Automatic Repeat Request (HARQ) procedure is used. According to the HARQ approach, after a transmitting entity has transmitted a block of data, the transmitting entity waits to receive a HARQ response from the receiving entity. If the transmitting entity receives a positive acknowledgement (ACK) as the HARQ response, then no re-transmission is needed and the transmitting entity can transmit additional data. If the transmitting entity receives a negative acknowledgement (NACK) as the HARQ response, then the transmitting entity re-transmits the data. The transmitting entity may also re-transmit the data if the transmitting entity does not receive any HARQ response within a certain period of time.

This re-transmission approach can allow data to be successfully transmitted from a transmitting entity to a receiving entity even when there is a substantial probability that the transmitted data will be received with one or more errors, for example, because of poor radio frequency (RF) conditions. Specifically, the data can be re-transmitted multiple times until the data is received without errors. This re-transmission approach, however, also increases latency. For example, there can be a period of delay between when the transmitting entity transmits data and when the transmitting entity receives a NACK response from the receiving entity and another period of delay between when the transmitting entity receives the NACK response and when the transmitting entity begins re-transmitting the data.

To reduce the delay associated with re-transmitting data, LTE supports a bundling option for data transmissions by a UE in the Physical Uplink Shared Channel (PUSCH). Normally, a UE transmits data in one transmission time interval (TTI), which corresponds to a 1 millisecond (ms) subframe, and then waits to receive a HARQ response before re-transmitting the data or transmitting additional data. However, when TTI bundling is used, the UE transmits the same data in multiple consecutive TTIs (i.e., a "bundle" of TTIs) and then waits to receive a HARQ response. In this way, the UE can transmit multiple instances of the same data, which allows for more robust reception of the data, but without the delay that would be associated with the UE transmitting the data multiple times and waiting for a HARQ response after each transmission.

The number of consecutive TTIs used to transmit the same data for a particular communication before waiting for a HARQ response is the "bundling size" of the TTI bundling scheme employed to transmit that communication. Conventional LTE systems typically use TTI bundling with a fixed bundling size of four TTIs to improve coverage at a cell edge for uplink communications on a single carrier.

OVERVIEW

To increase peak rate of data, some wireless communications networks provide for communications between a UE and a base station over multiple carriers simultaneously using a technique known as "carrier aggregation." With a carrier aggregation service, multiple carriers from either contiguous frequency bands or non-contiguous frequency bands are aggregated together as "component carriers" to increase the overall bandwidth available per slot by providing a greater extent of air interface resources in which the base station can schedule uplink and downlink communication with a UE. For instance, if a base station serves a UE on two 20 MHz TDD LTE carriers at once, the peak throughput may be about 120 Mbps. And if the base station serves a UE on three 20 MHz TDD LTE carriers at once, the peak throughput may be as high as 180 Mbps.

Although serving a UE on multiple carriers concurrently can help improve throughput for the UE, doing so also necessarily makes use of more radio frequency spectrum than serving the UE on just one of the carriers at a time. In practice, the operator of a wireless communication system may have only a limited extent of radio frequency spectrum, such as a limited number of licensed carriers, available for use to serve UEs in a given market. Providing UEs with carrier aggregation service in such a system may thus consume more of that limited radio frequency spectrum than providing UEs with service on just one carrier at a time and may thereby leave less spectrum available to serve other UEs.

Employing TTI bundling in connection with a carrier aggregation service can make such issues even more significant. Indeed, a carrier aggregation service with TTI bundling may consume more of that limited radio frequency spectrum for a longer period of time than serving a UE on a single carrier without TTI bundling. However, this increased consumption of network resources may be a good trade-off for the benefits of TTI bundling and carrier aggregation if the TTI bundling is dynamically configured and employed on a per-component-carrier basis (i.e., a component-carrier-by-component-carrier basis) based on the prevailing conditions for a wireless communication.

Consequently, it would be desirable to manage when to apply TTI bundling in connection with a carrier aggregation service and, when applying TTI bundling with a carrier aggregation service, to manage the bundling sizes used on each of the component carriers. Disclosed herein is a method and system for doing so, based at least in part on a consideration of one or more conditions associated with the component carriers of the carrier aggregation service. In particular, the disclosure provides for determining, on a per-component-carrier basis, one or more conditions associated with a plurality of component carriers on which a wireless communication will be transmitted using carrier aggregation and, based at least in part on the determined condition(s), deciding whether to apply TTI bundling for the wireless communication. If the decision is to apply TTI bundling, the disclosure provides for also determining, based at least in part on the determined condition(s), a respective bundling size for each component carrier on a per-component-carrier basis. Because the condition(s) for one component carrier may be different from the condition(s) for another component carrier, the bundling size determined for at least one of the component carriers may be different from the bundling size determined for another one of the component carriers. The disclosure then provides for invoking TTI bundling, while the base station is serving the UE with carrier aggregation, to transmit the wireless communication between the UE and the base station on each component carrier with the respectively determined bundling size for that component carrier.

Accordingly, the present disclosure provides for systems and methods that can dynamically determine and employ one or more different bundling sizes for a communication on different component carriers based on one or more conditions associated with the communication on those component carriers. In this way, the systems and methods of the present disclosure can achieve a more efficient usage of resources to facilitate TTI bundling with a carrier aggregation service.

According to aspects of the present disclosure, the one or more conditions, upon which the decision whether to apply TTI bundling and/or the determination of respective bundling sizes are based, can relate to factor(s) that may inform whether and to what extent it may be advantageous to employ TTI bundling in connection with carrier aggregation for a particular wireless communication. As one non-limiting example, the one or more conditions can relate to a quality of the air interface connection per component carrier. As another non-limiting example, the one or more conditions can relate to a level of loading per component carrier. As a further non-limiting example, the one or more conditions can relate to a type of data to be transmitted for the wireless communication per component carrier. As another non-limiting example, the one or more conditions can relate to a type of duplex mode to be utilized for the wireless communication per component carrier. In still other non-limiting examples, the one or more conditions can relate to two or more of the example conditions above. Other examples may also be possible.

In one respect, disclosed is a method operable by a base station. In accordance with the method, the base station serves a UE with carrier aggregation on a plurality of component carriers through an air interface connection between the base station and the UE. Further, the base station determines, per component carrier, a respective bundling size for transmitting a wireless communication between the UE and the base station with TTI bundling on the component carrier. According to aspects of the present disclosure, the determined bundling size for at least one of the plurality of component carriers is different than the determined bundling size for another one of the plurality of component carriers. While serving the UE with carrier aggregation on the plurality of component carriers, the base station then invokes TTI bundling to transmit the wireless communication between the UE and the base station on each component carrier with the respectively determined bundling size for that component carrier.

In another respect, disclosed is a base station that includes an antenna structure for communicating over a radio-frequency air interface, and a controller configured to manage communication via the antenna structure over the air interface. The controller is configured to (i) establish a radio-link-layer connection between the base station and a UE encompassing a plurality of component carriers to serve the UE with carrier aggregation, (ii) determine, per component carrier, a respective bundling size for transmitting a wireless communication between the UE and the base station with TTI bundling on the component carrier, and (iii) while the base station is serving the UE with carrier aggregation on the plurality of component carriers, invoke TTI bundling to transmit the wireless communication between the UE and the base station on each component carrier with the respectively determined bundling size for the component carrier. According to aspects of the present disclosure, the determined bundling size for at least one of the plurality of component carriers is different than the determined bundling size for another one of the plurality of component carriers.

Still further, in another respect, disclosed is a method of wireless communication between a base station and a UE using carrier aggregation and TTI bundling. In accordance with the method the base station serves the UE with carrier aggregation on a plurality of component carriers through an air interface connection between the base station and the UE. The plurality of component carriers includes at least a first component carrier and a second component carrier. The base station further determines a first bundling size N and a second bundling size M for transmitting a wireless communication on the first component carrier and the second component carrier, respectively, with TTI bundling. While serving the UE with carrier aggregation on the plurality of component carriers, the base station invokes TTI bundling to transmit the wireless communication between the UE and the base station using the first bundling size N for the first component carrier and the second bundling size M for the second component carrier. According to aspects of the present disclosure the first bundling size N is different from the second bundling size M.

These as well as other aspects, advantages, and alternatives will become apparent to those of ordinary skill in the art by reading the following detailed description, with reference where appropriate to the accompanying drawings. Further, it should be understood that the descriptions pro-

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
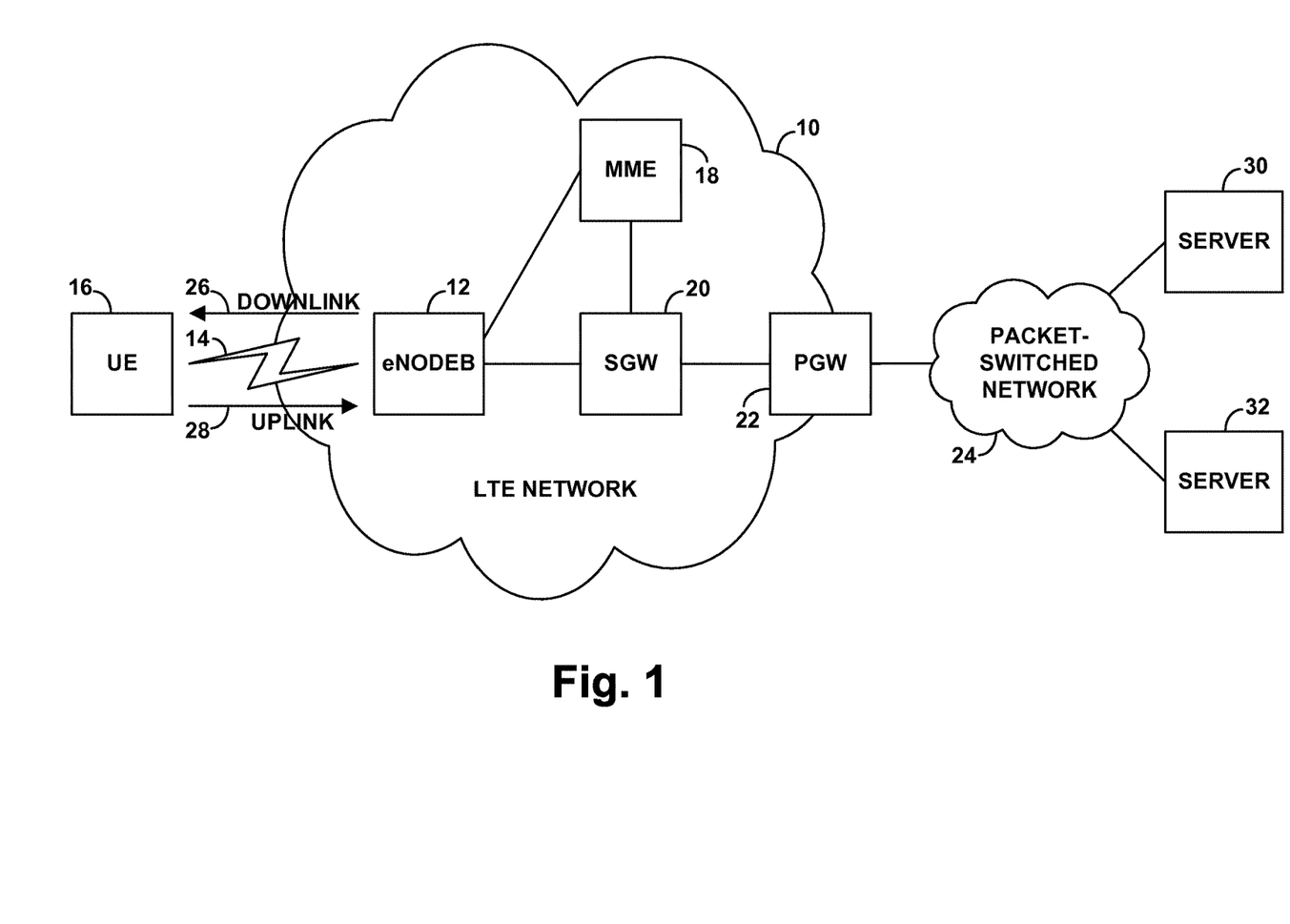
FIG. 1 is a simplified block diagram of a wireless communication system in which the present method and system can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve UEs with wireless packet data communication service, including possibly voice-over-packet service, but may also provide other functions. As shown, the LTE network 10 includes a base station (eNodeB) 12, which has an antenna structure and associated equipment for providing an LTE coverage area 14 in which to serve UEs such as an example UE 16 as shown. The eNodeB 12 then has a communication interface with a mobility management entity (MME) 18 that functions as a signaling controller for the LTE network 10. Further, the eNodeB 12 has a communication interface with a serving gateway (SGW) 20, which in turn has a communication interface with a packet-data network gateway (PGW) 22 that provides connectivity with a packet-switched network 24, and the MME 18 has a communication interface with the SGW 20. In practice, the illustrated components of the LTE network 10 may sit as nodes on a private packet-switched network owned by an operator of the LTE network 10, and thus the various communication interfaces may be logical interfaces through that network.

As illustrated, the air interface of coverage area 14 defines a downlink direction 26 from the eNodeB 12 to the UE 16 and an uplink direction 28 from the UE 16 to the eNodeB 12. Further, the eNodeB 12 and the UE 16 may be configured (e.g., licensed and programmed) to support air interface communication on various particular carriers, which may be FDD or TDD. Each such carrier and/or its particular downlink and uplink channels may be identified by one or more globally unique identifiers per industry standard, so that the eNodeB 12 and a served UE can refer to particular carriers by those identifiers.

According to LTE, each carrier's downlink channel may then define various sub-channels, such as a physical downlink control channel (PDCCH) for carrying scheduling directives and other control signaling from the eNodeB 12 to UEs, a physical downlink shared channel (PDSCH) for carrying scheduled downlink data communication, and a reference channel for carrying a reference signal that UEs can monitor to evaluate coverage quality. Likewise, each carrier's uplink channel may define various sub-channels, such as a physical uplink control channel (PUCCH) for carrying scheduling requests and other control signaling from the UEs to the eNodeB 12 and a physical uplink shared channel (PUSCH) for carrying scheduled uplink data communication.

With this arrangement, when the UE 16 enters into coverage of the eNodeB 12, the UE 16 may detect the eNodeB's 12 coverage on a particular carrier, and the UE 16 may engage in an attach process or handover process to register with the LTE network 10 on that carrier. For instance, the UE 16 may initially transmit to the eNodeB 12 an attach request, which the eNodeB 12 may pass along to the MME 18, triggering a process of authenticating the UE 16 and establishment of one or more logical bearer connections for the UE 16 between the eNodeB 12 and the PGW 22.

Further, the UE 16 may engage in signaling with the eNodeB 12 to establish a radio-link-layer connection (i.e., air interface connection) on the detected carrier, so that the eNodeB 12 may then serve the UE 16 on that carrier. For instance, the UE 16 and the eNodeB 12 may exchange radio resource control RRC configuration messaging to prepare the eNodeB 12 to serve the UE 16 on the carrier and to prepare the UE 16 to be served on the carrier. In this process, the eNodeB 12 may store a context record for the UE 16, indicating that the eNodeB 12 is serving the UE 16 on the particular carrier, so that the eNodeB 12 may then serve the UE 16 on the indicated carrier (e.g., then exchanging control signaling and bearer traffic with the UE 16 on that carrier) per that context record. Further, the UE 16 may store a context record indicating that the UE 16 is being served on that carrier, so that the UE 16 can then be served on that carrier (e.g., then exchanging control signaling and bearer traffic with the eNodeB 12 on that carrier) per that context record. As such, the radio-link-layer connection could be considered to effectively encompass initially just that one carrier.

In addition, during this initial attach process and/or more likely later while serving the UE 16, the eNodeB 12 and the UE 16 may engage in RRC configuration messaging and/or other processing to modify or otherwise set the UE's radio-link-layer connection to encompass a different number of carriers. In particular, the eNodeB 12 and the UE 16 may arrange the UE's 16 radio-link-layer connection to encompass two or more carriers so as to facilitate carrier aggregation service.

To set or adjust the carriers encompassed by the UE's 16 radio-link-layer connection, the eNodeB 12 may transmit to the UE 16 a RRC connection reconfiguration message that specifies the carriers on which the eNodeB 12 will be serving the UE 16, identifying each carrier by its global identifier for instance. Further, to facilitate carrier aggregation service, the eNodeB 12 may designate one such carrier as a primary carrier or primary cell (PCell) by a special PCell index and the eNodeB 12 may designate each other carrier as a secondary carrier or secondary cell (SCell) by a special SCell index. The eNodeB 12 may then also update its context record for the UE 16 to indicate that the UE's 16 radio-link-layer connection now encompasses the indicated carriers, so that the eNodeB 12 may then engage in communication with the UE 16 on those carriers. And the UE 16 may responsively update its context record to indicate that the UE's 16 radio-link-layer connection now encompasses the indicated carriers, so that the UE 16 will be prepared to engage in communication with the eNodeB 12 on those carriers.

This or another process can be used to add or remove one or more carriers from a UE's 16 radio-link-layer connection. For example, if the connection currently encompasses just one carrier, the process can be used to change the connection to encompass a different carrier and/or to add one or more additional carriers (e.g., as SCells) so as to facilitate carrier aggregation service. As another example, if the connection currently encompasses two or more carriers, the process can be used to add one or more additional carriers to the connection so as to provide increased carrier aggregation, or to remove one or more carriers from the connection so as to provide reduced carrier aggregation or to switch to single-carrier service. Other examples are possible as well.

As noted above, the present disclosure provides for dynamically employing TTI bundling in connection with a carrier aggregation service. In particular, the disclosure provides for determining, on a per-component-carrier basis, one or more conditions associated with a plurality of component carriers on which a wireless communication will be transmitted using carrier aggregation and, based at least in part on the determined condition(s), deciding whether to apply TTI bundling for the wireless communication. If the decision is to apply TTI bundling, the disclosure provides for also determining, based at least in part on the determined condition(s), a respective bundling size for each component carrier on a per-component-carrier basis. The disclosure then provides for invoking TTI bundling, while the eNodeB 12 is serving the UE 16 with carrier aggregation, to transmit the wireless communication between the UE 16 and the eNodeB 12 on each component carrier with the respectively determined bundling size for that component carrier.

This process can be carried out by the eNodeB 12 itself and/or by one or more other network entities, such as with portions of the analysis carried out by an entity outside of the eNodeB 12 and the eNodeB 12 then responsively activating TTI bundling according to the analysis. For simplicity, however, the process will be described here in a scenario where the eNodeB 12 carries out all aspects of the process.

The process may begin in a scenario where the eNodeB 12 is serving the UE 16 with carrier aggregation on a plurality of component carriers. As such, the eNodeB 12 may allocate PDSCH and/or PUSCH resources on the component carriers concurrently (e.g., distributing the data transmission among resources on the component carriers) and may transmit to the UE 16 on a PDCCH of the PCell and perhaps also on a PDCCH of one or more SCells one or more downlink control information (DCI) messages that specify the allocation. The eNodeB 12 and the UE 16 may then communicate the data on the allocated resources.

For any particular wireless communication between the UE 16 and the eNodeB 12, the allocation of resources and transmission of data are based on whether and to what extent TTI bundling is employed for that wireless communication. If TTI bundling is not applied for a wireless communication, data is transmitted in one TTI (i.e., one subframe) allocated on each of the component carriers of the carrier aggregation service. The transmitting entity (i.e., the UE 16 for an uplink communication or the eNodeB 12 for a downlink communication) then waits to receive a HARQ response to determine whether any portion of the data should be re-transmitted or whether the transmitting entity can transmit additional data. By contrast, if TTI bundling is applied for the wireless communication, data is transmitted in multiple, consecutive TTIs on each of the component carriers before waiting for the HARQ response. The number of consecutive TTIs (i.e., the bundling size) allocated for transmission on each component carrier is determined on a per-component-carrier basis and may differ from one component carrier to the next for the wireless communication, as further described below.

According to aspects of the present disclosure, the one or more conditions (upon which the decision whether to apply TTI bundling and/or the determination of respective bundling sizes are based) can relate to factor(s) that may inform whether and to what extent it may be advantageous to employ TTI bundling in connection with carrier aggregation for a particular wireless communication. Because the condition(s) for one component carrier may be different from the condition(s) for another component carrier, the bundling size determined for at least one of the component carriers may be different from the bundling size determined for another one of the component carriers. Accordingly, the present disclosure provides for dynamically determined, asymmetric TTI bundling in connection with a carrier aggregation service.

According to some aspects of the present disclosure, the one or more conditions can relate to, for example, a quality of the radio-link-layer connection (i.e., the air interface connection) for each of the component carriers. The quality of the radio-link-connection for each component carrier may affect the success rate for data transmissions on that component carrier. The better the quality of the radio-link-layer connection is for a component carrier, the greater the expected success rate for data transmissions on that component carrier. Conversely, the poorer the quality of the radio-link-layer connection is for a component carrier, the lower the expected success rate for data transmissions on that component carrier. Notably, each component carrier may exhibit different radio channel characteristics (e.g., propagation path loss, interference, etc.) and, thus, the quality of the radio-link-layer connection may vary from one component carrier to the next.

The quality of the radio-link-layer connection for each component carrier can be determined by the eNodeB 12 in a variety of ways. For instance, the eNodeB 12 may determine the connection quality for each component carrier based on one or more reports provided by the UE 16 to the eNodeB 12 (e.g., via channel status information reports). The report(s) can include an indication of the quality of the radio-link-layer connection for each component carrier, per-component-carrier, based on measurements made by the UE 16. For example, the reports can include indications relating to a signal strength (e.g., of reference signals or symbols), a Signal-to-Interference Ratio (SIR) of reference signals or symbols, a Block Error Rate (BLER) of one or more control signals, and/or other channel quality indicators (CQI) determined by the UE 16 on a component-carrier-by-component-carrier basis. In one example implementation, the UE 16 can utilize a reference signal received power (RSRP) approach and/or a reference signal received quality (RSRQ) approach to measure the quality of the radio-link-layer connection on a per-component-carrier basis.

Accordingly, based on the report(s) received by the eNodeB 12 from the UE 16, the eNodeB 12 can determine an indication of the quality of the radio-link-connection for each of the multiple component carriers on a component-carrier-by-component-carrier basis. It should be understood that the reporting by the UE 16 to the eNodeB 12 may be real-time reporting, timed reporting, or event-driven reporting to the eNodeB 12. It should also be understood that, according to other example implementations, the eNodeB 12 can directly evaluate the quality of the radio-link-layer connection for each component carrier (e.g., based on direct measurements by the eNodeB 12 of signal strength, SIR, and/or BLER) on a component-carrier-by-component-carrier basis.

In an example implementation, the one or more conditions relating to the quality of the radio-link-layer connection for each component carrier can be based on, for example, a comparison of each determined indication of quality to one or more quality-threshold values. For instance, the one or more quality-threshold values can be configured to facilitate a determination by the eNodeB 12 as to whether the radio-link-layer connection is threshold good or threshold poor for each of the component carriers on a per-component-carrier basis. In some example implementations, the determined indications of connection quality for the component carriers can all be compared to the same set of quality-threshold value(s). In other example implementations, the quality-threshold value(s) used for one component carrier can be different from the quality-threshold value(s) used for at least one other component carrier. It is contemplated that any number of quality-threshold values may be utilized to analyze, on a per-component-carrier basis, the determined indications of quality to determine the one or more conditions related to the quality of the radio-link-layer connection between the UE 16 and the eNodeB 12.

According to additional or alternative aspects of the present disclosure, the one or more conditions can relate to, for example, a level of loading on each of the component carriers. In one example implementation, the level of loading can be measured for each component carrier, on a per-component-carrier basis, to determine a total amount of loading from all devices communicating with the eNodeB 12 on that component carrier. In another example implementation, the level of loading can be measured for each component carrier, on a per-component-carrier basis, to determine the amount of loading attributable to only the UE 16 on that component carrier. That is, the measured level of loading may not include any amount of loading attributable to other UEs. As non-limiting examples, the level of loading for each component carrier can be measured, per component carrier, as a tonnage of data transmitted over the component carrier, the number of UEs transmitting data over the component carrier, a combination of the tonnage of data transmitted and the number of UEs transmitting data, etc. According to additional or alternative examples, the determined level of loading can include an indication as to an amount of data that is scheduled to be transmitted between the UE 16 and the eNodeB 12. For example, the eNodeB 12 may receive a buffer status report from the UE 16. The buffer status report may include a buffered-data value indicative of an amount of data of the wireless communication being buffered by the UE 16 for transmission to the eNodeB 12. Additionally or alternatively, for example, the eNodeB 12 may determine the level of loading based on an amount of data buffered by the eNodeB 12 for transmission to the UE 16.

In an example implementation, the one or more conditions relating to the level of loading for each component carrier can be based on, for example, a comparison of each determined level of loading to one or more load-threshold values. For instance, the one or more load-threshold values can be configured to facilitate a determination as to whether each component carrier is threshold heavily loaded or threshold lightly loaded on a per-component-carrier basis. In some example implementations, the levels of loading determined for the component carriers can all be compared to the same set of load-threshold value(s). In other example implementations, the load-threshold value(s) used for one component carrier can be different from the load-threshold value(s) used for at least one other component carrier. It is contemplated that any number of load-threshold values may be utilized for analyzing the determined levels of loading to determine the one or more conditions.

Additionally or alternatively, for example, the one or more conditions relating to the level of loading for each component carrier can be based on a comparison of each determined level of loading relative to the other determined levels of loading. For example, by comparing the various different determined levels of loading, it may be determined by what factor one component carrier is more heavily loaded than another component carrier. As such, a condition relating to the level of loading can be determined based on, for example, a comparison of a ratio of loading levels for two or more component carriers to one or more threshold values.

According to other additional or alternative aspects of the present disclosure, the one or more conditions can relate to, for example, a type of data to be communicated on each component carrier for a wireless communication. According to some implementations, a wireless communication between a UE and an eNodeB may include a plurality of different types of content. For example, the UE 16 may engage in data communication with various servers or other entities (possibly even other end user devices) on or via network 24, with the communication passing through the UE's 16 radio-link-layer connection and through the SGW 20, the PGW 24, and the network 24. FIG. 1 depicts two examples of such entities as servers 30 and 32. These servers 30 and 32 may take various forms and may be set to communicate data representing various different types of content. By way of example, a representative server might be a web server that communicates web content, an e-mail server that communicates e-mail content, a streaming video server that transmits streaming video content (e.g., movies and television shows), a game server that communicates game content, an Internet Multimedia Subsystem (IMS) that supports voice calling, and the like. As a specific example, the server 30 may be a streaming video server that is operated by one streaming video service provider and that provides streaming video content, and the server 32 may be another streaming video server that is operated by another streaming video service provider and that also provides streaming video content. Other examples are possible as well.

To facilitate communication between the UE 16 and such entities, the UE 16 and each entity may each have a network address such as an Internet Protocol (IP) address on the network 24. The UE 16 and the entity may thus transmit data to each other in the form of one or more IP data packets, each having a respective header segment specifying a source IP address and a destination IP address, and each having a respective payload segment carrying some or all of the data at issue. Further, when the UE 16 and the entity communicate data representing content of a particular type, such as content associated with a particular application, each packet may further include a transport port number (e.g., a particular Transmission Control Protocol (TCP) port number or User Datagram Protocol (UDP) port number) associated with that content type and/or another designation of the type of content carried by the packet, to facilitate processing by corresponding program logic at the UE 16 and/or at the entity.

The data carried in the payload segment of such packets may be a digitally encoded representation of particular content being communicated between the UE 16 and the entity. Such content may itself be media content of some type, such as video content, web content, voice content, gaming content, or the like. Alternatively, the content may be signaling content, such as Session Initiation Protocol (SIP), Real-Time Streaming Protocol (RTSP), or Hypertext Transfer Protocol (HTTP) messages used for setting up or otherwise controlling certain media content transmission. Such signaling content may then also include data that specifies other type of content that will be communicated to or from the UE 16. For instance, SIP signaling can carry a Session Description Protocol (SDP) segment that designates a type of content to be communicated to or from the UE.

The eNodeB 12 may determine the type of content that will be communicated between the eNodeB 12 and the UE 16 in various ways. By way of example, the eNodeB 12 may determine the type of content per component carrier based on deep packet inspection (DPI) of one or more packets passing to or from the UE 16, and/or based on various associated signaling or other data. As an example of this, the eNodeB 12 may read one or more such packets to determine a type of content being carried by such packet(s) and can consider that to be an indication of the type of content that will be communicated between the eNodeB 12 and the UE 16. For instance, the eNodeB 12 may read from one or more such packets a network address of a remote entity with which the UE 16 is communicating and/or a transport port number associated with the type of content, and the eNodeB 12 can map the network address and/or port number to a particular type of content.

To do this, the eNodeB 12 may include or have access to a table that maps various network addresses and/or port numbers to corresponding types of content (e.g., indicating for each network address one or more possible types of content, and further indicating for each port associated with data sent to or from that network address a corresponding type of content), and the eNodeB 12 may be programmed to refer to that table to determine the type of content that will be communicated to or from the UE. Through this process, the eNodeB 12 might thereby determine that such packet data is streaming video content from a particular provider, streaming video content from another particular provider, streaming video content generally, gaming content, voice content, web content, and/or various other types of content such as those noted above for instance.

As another example, the eNodeB 12 may read the payload of one or more such packets and programmatically evaluate the data in the payload to project what type of content will be communicated between the eNodeB 12 and the UE 16. For instance, if the payload carries SIP signaling or the like, the eNodeB 12 may read that signaling to determine an SDP-based indication of type of content that will be communicated to or from the UE 16, again possibly a type such as one of those noted above. Other examples are possible as well.

According to still other additional or alternative aspects of the present disclosure, the one or more conditions can relate to, for example, the type of duplex mode to be utilized for the wireless communication on each component carrier. For example, each of the component carriers may be frequency division duplex (FDD), in which the downlink and uplink channels are defined as separate respective ranges of frequency, or time division duplex (TDD), in which the downlink and uplink channels are defined on a common range of frequency but distinguished through time division multiplexing. In some instances, the wireless communication may be transmitted with carrier aggregation on a first subset of the component carriers using FDD and on a second subset of the component carriers using TDD. In other instances, the wireless communication may be transmitted on all of the component carriers using FDD or all of the component carriers using TDD. The eNodeB 12 may thus be configured to determine, on a component-carrier-by-component-carrier basis, the type of duplex mode that will be utilized for each component carrier to transmit the wireless communication between the UE 16 and the eNodeB 12 with carrier aggregation.

As noted above, based at least on the determined one or more conditions, (i) the eNodeB 12 may make a decision to apply TTI bundling while serving the UE with carrier aggregation and (ii) the eNodeB 12 may determine, on a component-carrier-by-component-carrier basis, a respective bundling size for transmitting a wireless communication on each of the component carriers. To facilitate this, the eNodeB 12 may include or have access to a table that maps the one or more conditions to an indication of whether or not to apply TTI bundling and further, if the indication is to apply TTI bundling, to an indication of a respective bundling size for each component carrier, on a per-component-carrier basis. For instance, such a table may list various different conditions and/or combinations of conditions and specify, for each condition and/or combination, (i) a decision whether to apply TTI bundling and/or (ii) a respective bundling size for each component carrier on a per-component-carrier basis. Accordingly, the eNodeB 12 may be programmed to refer to that table to decide whether to apply carrier aggregation and, if applicable, determine how many consecutive TTIs to use for data on each component carrier.

Through this process, if the eNodeB 12 thereby decides to apply TTI bundling for a wireless communication while serving the UE with carrier aggregation, then the eNodeB 12 may respond to that decision by allocating resources on each of the component carriers according to the determined bundling size for that component carrier such that data for the wireless communication may be transmitted between the UE 16 and the eNodeB 12 with carrier aggregation and TTI bundling. For example, the eNodeB 12 may engage in RRC messaging with the UE 16 to activate TTI bundling and indicate the bundling sizes that will be used for the wireless communication. If the wireless communication is an uplink communication, the eNodeB 12 can direct the UE 16 to apply TTI bundling, with the respectively determined bundling size for each component carrier, to transmit the wireless communication to the eNodeB 12 on the component carriers. If the wireless communication is a downlink communication, the eNodeB 12 applies TTI bundling, with the respectively determined bundling size for each component carrier, to transmit the wireless communication to the UE 16 on the component carriers. As another example, the eNodeB 12 can apply TTI bundling with a particular bundling size on a given component carrier by specifying the bundling size in one or more DCI messages scheduling PDSCH and/or PDCCH resources for the UE 16.

According to some aspects of the present disclosure, the one or more conditions used to decide whether to apply TTI bundling can be the same as the one or more conditions used to determine the different TTI bundling sizes used on the respective component carriers. According to alternative aspects of the present disclosure, a first set of one or more conditions used to decide whether to apply TTI bundling can be different from a second set of one or more conditions that are used to determine the respective bundling sizes. As one non-limiting example, the decision whether to apply TTI bundling can be based on an indication of the quality of the air interface connection for the component carriers while the determination of the bundling sizes can be based on the type of data and the loading for each component carrier. It should be understood that other examples are possible.

It should also be understood that the conditions described above are provided as non-limiting examples of the types of conditions that may be considered to decide whether to apply TTI bundling and/or determine a bundling size on a per-component-carrier basis for transmitting a wireless communication with carrier aggregation and TTI bundling. Other example conditions also may be possible.

Figure 2:
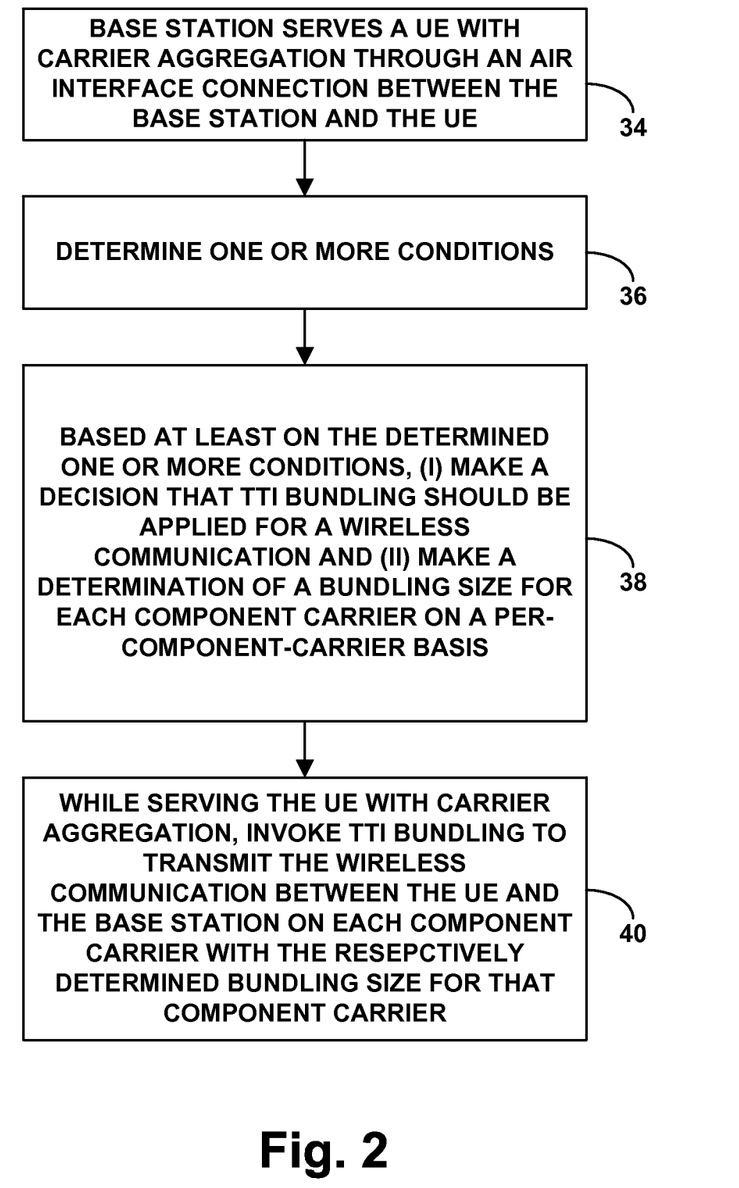
FIG. 2 is a flow chart depicting example operations in accordance with the disclosure.

FIG. 2 is next a flow chart depicting an example set of operations that can be carried out in an implementation of this process. As shown in FIG. 2, at block 34, the method begins with a base station (e.g., the eNodeB 12) serving a UE with carrier aggregation on a plurality of component carriers through an air interface connection between the base station and the UE. At block 36, the method involves determining one or more conditions for each component carrier on a component-carrier-by-component-carrier basis. At block 38, the method involves, based at least on the determined one or more conditions, (i) making a decision that TTI bundling should be applied for a wireless communication and (ii) making a determination of a bundling size, on a per-component-carrier basis, for applying the TTI bundling on the component carriers. Because the condition(s) for one component carrier may be different from the condition(s) for another component carrier, the bundling size determined for at least one of the component carriers may be different from the bundling size determined for another one of the component carriers. At block 40, the method then involves, while serving the UE with carrier aggregation, the eNodeB invoking TTI bundling to transmit the wireless communication between the UE and the base station on each component carrier with the respectively determined bundling size for that component carrier.

Figure 3:
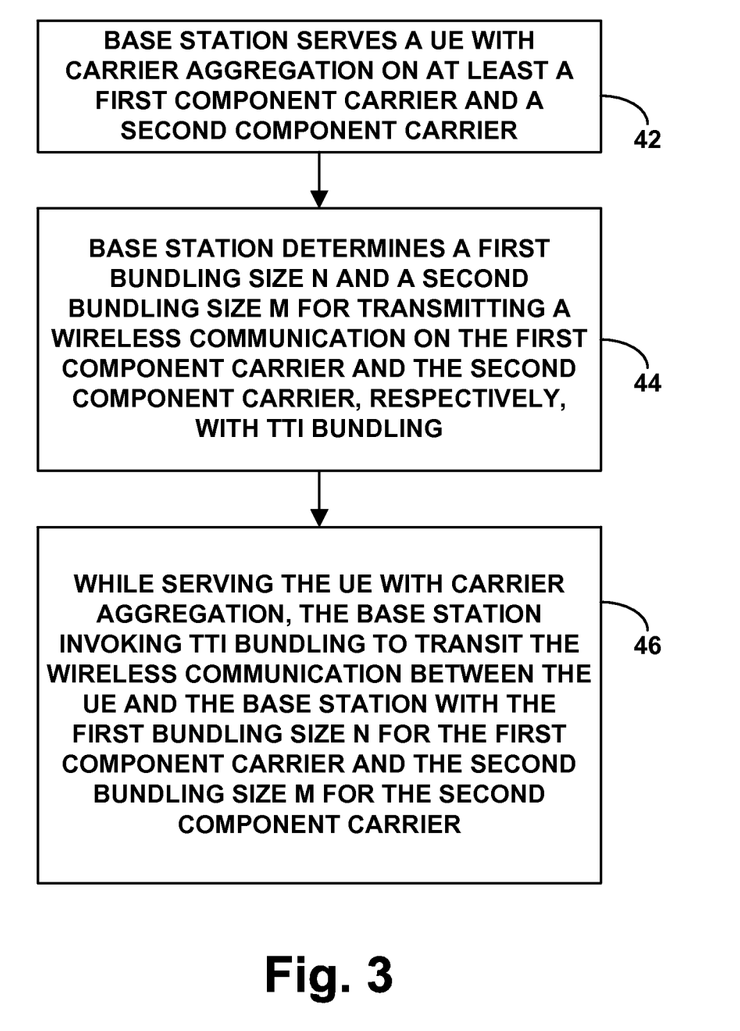
FIG. 3 is another flow chart depicting example operations in accordance with the disclosure.

FIG. 3 is next a flow chart depicting another example set of operations that can be carried out by a base station such as eNodeB 12 in an implementation of this process. In an example implementation, the illustrated process relates to a scenario where the base station has an established radio-link-layer connection with a UE served by the base station. As shown in FIG. 3, at block 42, the base station serves the UE with carrier aggregation on at least a first component carrier and a second component carrier. Further, at block 44, the base station determines a first bundling size N and a second bundling size M for transmitting a wireless communication on the first component carrier and the second component carrier, respectively, with TTI bundling. And at block 46, while serving the UE with carrier aggregation, the base station invokes TTI bundling to transmit the wireless communication between the UE and the base station using the first bundling size N for the first component carrier and the second bundling size M for the second component carrier. The first bundling size N may be different from the second bundling size M. Various other features described above can be incorporated into this method as well.

Figure 4:
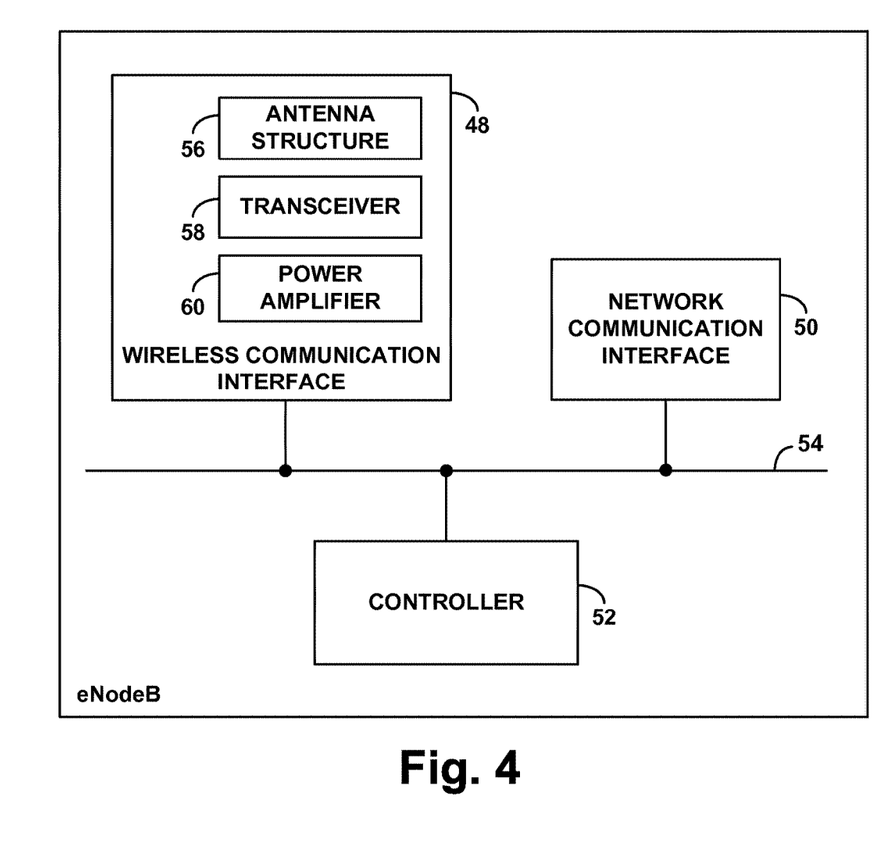
FIG. 4 is a simplified block diagram of an example base station operable in accordance with the disclosure.

FIG. 4 is a simplified block diagram of an example eNodeB (e.g., macro eNodeB, small cell, or other type of base station), showing some of the components that such a device may include in order to carry out these and other operations. As shown, the example eNodeB includes a wireless communication interface 48, a network communication interface 50, and a controller 52, all of which can be integrated together in various ways or, as shown, interconnected with each other through a system bus, network, or other connection mechanism 54.

Wireless communication interface 48 includes an antenna structure (e.g., one or more antennas or antenna elements) 56, which can be tower mounted or provided in some other manner, configured to transmit and receive over the air interface and thereby facilitate communication with served UEs. Further, the wireless communication interface includes a transceiver 58 and power amplifier 60 supporting air interface communication according to the LTE protocol. Network communication interface 50 may then comprise one or more wired and/or wireless network interfaces (such as an Ethernet interface) through which the base station may transmit and receive data over a backhaul connection with SGW 20 as discussed above.

Controller 52, which may be integrated with wireless communication interface 48 or with one or more other components of the eNodeB, may then be configured to manage communication over the air interface, including managing transmission of a wireless communication between the eNodeB and a UE employing both carrier aggregation and TTI bundling in accordance with the present disclosure. By way of example, controller 44 may be configured to (i) establish a radio-link-layer connection between the base station and a UE encompassing a plurality of component carriers to serve the UE with carrier aggregation, (ii) determine, per component carrier, one or more conditions for each component carrier, (iii) decide, based at least in part on the determined one or more conditions, whether to apply TTI bundling, (iv) determine, per component carrier based at least in part on the determined one or more conditions, a respective bundling size for transmitting a wireless communication between the UE and the base station with TTI bundling on each component carrier, and (v) while the base station is serving the UE with carrier aggregation on the plurality of component carriers, invoke TTI bundling to transmit the wireless communication between the UE and the base station on each component carrier with the respectively determined bundling size for the component carrier. According to aspects of the present disclosure, the determined bundling size for at least one of the plurality of component carriers may be different than the determined bundling size for another one of the plurality of component carriers.

Controller 52 can be implemented using hardware, software, and/or firmware. For example, controller 52 can include one or more processors and a non-transitory computer readable medium (e.g., volatile and/or non-volatile memory) that stores machine language instructions or other executable instructions. The instructions, when executed by the one or more processors, may cause controller 52, and thus the eNodeB, to carry out the various base station operations described herein.

FIGS. 3-4, described by way of example above, represent algorithms that correspond to at least some instructions executed by the controller 52 in FIG. 4 to perform the above described functions associated with the described concepts. It is also within the scope and spirit of the present concepts to omit steps, include additional steps, and/or modify the order of steps presented above.

Exemplary embodiments have been described above. Those skilled in the art will understand, however, that changes and modifications may be made to these embodiments without departing from the true scope and spirit of the invention.

What is claimed is:

1. A method comprising:
serving, by a base station, a user equipment device (UE) with carrier aggregation on a plurality of component carriers through an air interface connection between the base station and the UE;
determining, per component carrier, a respective transmission time interval (TTI) bundling size for transmitting a wireless communication between the UE and the base station with TTI bundling on the component carrier, wherein transmitting the wireless communication with TTI bundling comprises automatically repeat-transmitting given data of the wireless communication within multiple consecutive TTIs of the air interface before then waiting to receive a hybrid automatic repeat request (HARQ) response indicating whether the given data was thereby successfully received, wherein each TTI of the multiple consecutive TTIs carries a respective instance of the same given data, wherein the respectively determined TTI bundling size per component carrier defines how many TTIs constitute the multiple consecutive TTIs in which the repeat-transmitting occurs on the component carrier, wherein the determined TTI bundling size for at least one of the plurality of component carriers is different than the determined TTI bundling size for another one of the plurality of component carriers; and
while serving the UE with carrier aggregation on the plurality of component carriers, the base station invoking TTI bundling to transmit the wireless communication between the UE and the base station on each component carrier with the respectively determined TTI bundling size for the component carrier.

2. The method of claim 1, further comprising determining a level of loading on each component carrier, wherein the determining the respective TTI bundling size per component carrier comprises determining, per component carrier, the respective TTI bundling size based at least in part on the determined level of loading for the component carrier.

3. The method of claim 1, further comprising determining an indication of a quality of the air interface connection for each component carrier, wherein the determining the respective TTI bundling size per component carrier comprises determining, per component carrier, the respective TTI bundling size based at least in part on the determined indication of the quality of the air interface connection for the component carrier.

4. The method of claim 1, further comprising determining, for each component carrier, a type of data to be transmitted for the wireless communication, wherein the determining the respective TTI bundling size per component carrier comprises determining, per component carrier, the respective TTI bundling size based at least in part on the determined type of data to be transmitted for the wireless communication on the component carrier.

5. The method of claim 1, wherein each component carrier has a respective type of duplex mode that is utilized for transmissions between the base station and the UE on the component carrier, and wherein the determining the respective TTI bundling size per component carrier comprises determining, per component carrier, the respective TTI bundling size based at least in part on the type of duplex mode to be utilized for the wireless communication on the component carrier.

6. The method of claim 1, wherein the determining the respective TTI bundling size per component carrier comprises determining, per component carrier, the respective TTI bundling size based on at least two factors selected from the group consisting of (i) a type of data to be transmitted for the wireless communication on the component carrier, (ii) a level of loading on the component carrier, (iii) an indication of a quality of the air interface connection for the component carrier, and (iv) a type of duplex mode to be utilized for the wireless communication on the component carrier.

7. The method of claim 1, further comprising the base station deciding whether to apply TTI bundling for the wireless communication based on one or more factors selected from the group consisting of (i) a type of data to be transmitted for the wireless communication on the component carrier, (ii) a level of loading on the component carrier, (iii) an indication of a quality of the air interface connection for the component carrier, and (iv) a type of duplex mode to be utilized for the wireless communication on the component carrier, and
wherein the determining, per component carrier, the respective TTI bundling size and the invoking TTI bundling are in response to the base station deciding to apply TTI bundling for the wireless communication.

8. The method of claim 1, wherein the base station invoking TTI bundling includes the base station applying TTI bundling, with the respectively determined TTI bundling size for each component carrier, to transmit the wireless communication as a downlink communication to the UE on the plurality of component carriers.

9. The method of claim 1, wherein the base station invoking TTI bundling includes the base station directing the UE to apply TTI bundling, with the respectively determined TTI bundling size for each component carrier, to transmit the wireless communication as an uplink communication to the base station on the plurality of component carriers.

10. A base station comprising:
one or more antennas for communicating over a radio-frequency air interface; and
a controller configured to manage communication via the one or more antennas over the air interface,
wherein the controller is configured to (i) establish a radio-link-layer connection between the base station and a user equipment device (UE) encompassing a plurality of component carriers to serve the UE with carrier aggregation, (ii) determine, per component carrier, a respective transmission time interval (TTI) bundling size for transmitting a wireless communication between the UE and the base station with TTI bundling on the component carrier, and (iii) while the base station is serving the UE with carrier aggregation on the plurality of component carriers, invoke TTI bundling to transmit the wireless communication between the UE and the base station on each component carrier with the respectively determined TTI bundling size for the component carrier,
wherein transmitting the wireless communication with TTI bundling comprises automatically repeat-transmitting given data of the wireless communication within multiple consecutive TTIs of the air interface before then waiting to receive a hybrid automatic repeat request (HARQ) response indicating whether the given data was thereby successfully received,
wherein each TTI of the multiple consecutive TTIs carries a respective instance of the same given data, wherein the respectively determined TTI bundling size per component carrier defines how many TTIs constitute the multiple consecutive TTIs in which the repeat-transmitting occurs on the component carrier, and wherein the determined TTI bundling size for at least one of the plurality of component carriers is different than the determined TTI bundling size for another one of the plurality of component carriers.

11. The base station of claim 10, wherein the controller is further configured to determine a level of loading on each component carrier, and wherein the controller is configured to determine, per component carrier, the respective TTI bundling size based on the determined level of loading for the component carrier.

12. The base station of claim 10, wherein the controller is further configured to determine an indication of a quality of the radio-link-layer connection for each component carrier, and wherein the controller is configured to determine, per component carrier, the respective TTI bundling size based on the determined indication of the quality of the radio-link-layer connection for the component carrier.

13. The base station of claim 10, wherein the controller is further configured to determine a type of data to be transmitted for the wireless communication on each component carrier, and wherein the controller is configured to determine, per component carrier, the respective TTI bundling size based on the determined type of data to be transmitted for the wireless communication on the component carrier.

14. The base station of claim 10, wherein each component carrier has a respective type of duplex mode that is utilized for transmissions between the base station and the UE on the component carrier, and wherein the controller is configured to determine, per component carrier, the respective TTI bundling size based on the type of duplex mode to be utilized for the wireless communication on the component carrier.

15. The base station of claim 10, wherein the controller is configured to determine, per component carrier, the respective TTI bundling size based on at least two factors selected from the group consisting of (i) a type of data to be transmitted for the wireless communication on the component carrier, (ii) a level of loading on the component carrier, (iii) an indication of a quality of the air interface connection for the component carrier, and (iv) a type of duplex mode to be utilized for the wireless communication on the component carrier.

16. The base station of claim 10, wherein the respective TTI bundling size determined for each of the component carriers is greater than one TTI.

17. The base station of claim 10, wherein, to invoke the TTI bundling, the controller is configured to cause the one or more antennas to transmit the wireless communication as a downlink communication to the UE on the plurality of component carriers using the respectively determined TTI bundling sizes.

18. The base station of claim 10, wherein, to invoke the TTI bundling, the controller is configured to direct the UE to transmit the wireless communication as an uplink communication to the base station on the plurality of component carriers using the respectively determined TTI bundling sizes.

19. A method for wireless communication between a base station and a user equipment device (UE) using carrier aggregation and transmission time interval bundling (TTI), the method comprising:

serving, by a base station, a user equipment device (UE) with carrier aggregation on a plurality of component carriers through an air interface connection between the base station and the UE, the plurality of component carriers including at least a first component carrier and a second component carrier;

determining a first TTI bundling size N and a second TTI bundling size M for transmitting a wireless communication on the first component carrier and the second component carrier, respectively, with TTI bundling, wherein transmitting the wireless communication with TTI bundling comprises automatically repeat-transmitting given data of the wireless communication within multiple consecutive TTIs of the air interface before then waiting to receive a hybrid automatic repeat request (HARM) response indicating whether the given data was thereby successfully received, wherein each TTI of the multiple consecutive TTIs carries a respective instance of the same given data, wherein the first TTI bundling size N defines how many TTIs constitute the multiple consecutive TTIs in which the repeat-transmitting occurs on the first component carrier, and wherein the second TTI bundling size M defines how many TTIs constitute the multiple consecutive TTIs in which the repeat-transmitting occurs on the second component carrier, wherein the first TTI bundling size N is different from the second TTI bundling size M; and while serving the UE with carrier aggregation on the plurality of component carriers, the base station invoking TTI bundling to transmit the wireless communication between the UE and the base station using the first TTI bundling size N for the first component carrier and the second TTI bundling size M for the second component carrier.

20. The method of claim 19, further comprising:

determining at least two factors for the first component carrier from the group consisting of: (i) a type of data to be transmitted for the wireless communication on the first component carrier, (ii) a level of loading on the first component carrier, (iii) an indication of a quality of the air interface connection for the first component carrier, and (iv) a type of duplex mode to be utilized for the wireless communication on the first component carrier; and determining at least two factors for the second component carrier from the group consisting of: (i) a type of data to be transmitted for the wireless communication on the second component carrier, (ii) a level of loading on the second component carrier, (iii) an indication of a quality of the air interface connection for the second component carrier, and (iv) a type of duplex mode to be utilized for the wireless communication on the second component carrier, wherein the determining the first TTI bundling size N comprises determining the first TTI bundling size N based on the at least two factors determined for the first component carrier, and wherein the determining the second TTI bundling size M comprises determining the second TTI bundling size M based on the at least two factors determined for the second component carrier.

* * * * *